(12) United States Patent
Amorello et al.

(10) Patent No.: US 7,796,523 B2
(45) Date of Patent: Sep. 14, 2010

(54) NETWORK USAGE OPTIMIZATION WITH RESPECT TO A VIRTUAL CIRCUIT NETWORK

(75) Inventors: Stephen L. Amorello, Tarpon Springs, FL (US); Thomas F. Boylan, Apex, NC (US); Rick A. Hamilton, II, Charlottesville, VA (US); Richard H. Le Sesne, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 11/071,622

(22) Filed: Mar. 2, 2005

(65) Prior Publication Data
US 2006/0209841 A1    Sep. 21, 2006

(51) Int. Cl.
*H04L 12/26* (2006.01)
*H04L 12/28* (2006.01)
*H04L 12/16* (2006.01)
*G06F 15/173* (2006.01)
*G06F 15/16* (2006.01)

(52) U.S. Cl. ............... 370/237; 370/337; 709/226; 709/223; 709/224; 709/232; 709/233

(58) Field of Classification Search ........... 370/237, 370/337
See application file for complete search history.

(56) References Cited

U.S. PATENT DOCUMENTS 6,912,575 B1 *   6/2005   Swift et al. ............ 709/226

| | | |
|---|---|---|
| 2001/0001321 A1 | 5/2001 | Resnick et al. |
| 2002/0019873 A1 | 2/2002 | Goldszmidt et al. |
| 2003/0065566 A1 | 4/2003 | Kodaka et al. |
| 2003/0101262 A1 | 5/2003 | Godwin |
| 2003/0220834 A1 | 11/2003 | Leung et al. |
| 2004/0039815 A1 | 2/2004 | Evans et al. |
| 2004/0088298 A1 | 5/2004 | Zou et al. |

OTHER PUBLICATIONS

Taylor, Steven, "Pay as you go for frame relay", Jul. 6, 1998, LookSmart, pp. 1-4.*
USMA, "Website Usage Statistics", Jan. 28, 2001, US Metric Association, all pages.*
Taylor, "Pay As You Go for Frame Relay", Jul. 7, 1998, Network World, all pages.*
Kessler, "Frame Relay: CIR and Billing Issueas Revealed", Jun. 1995, Gary Kessler, all pages.*

* cited by examiner

*Primary Examiner*—Kwang B Yao
*Assistant Examiner*—Adam Duda
(74) *Attorney, Agent, or Firm*—Schmeiser, Olsen & Watts; Wiliam E. Schiesser

(57) ABSTRACT

A network usage optimization method for minimizing the total network usage fee. The method includes the steps of (a) providing a network and a data processing apparatus, wherein the data processing apparatus communicates via a PVC of the network; (b) obtaining past network traffic data for traffic over the PVC; (c) predicting future network traffic data for traffic over the PVC for a future time period based on the past network traffic data; and (d) based on the predicted future network traffic data, specifying a CIR for the PVC for the future time period that will result in a minimum predicted total network usage fee for the future time period.

20 Claims, 3 Drawing Sheets

NETWORK USAGE OPTIMIZATION WITH RESPECT TO A VIRTUAL CIRCUIT NETWORK

BACKGROUND OF THE INVENTION

1. Technical Field

The present invention relates to network usage, and more particularly, to network usage optimization so as to minimize the total network usage fee.

2. Related Art

In a typical department store (or a point of sale, in general), credit authorization requests are usually transmitted to a bank via a network. The store has to pay network usage fees to the network providers for the use of the network. As a result, there is a need for a method for utilizing the network so as to save network usage fees for the store.

SUMMARY OF THE INVENTION

The present invention provides a network usage optimization method, comprising the steps of (a) providing a network and a data processing apparatus, wherein the data processing apparatus communicates via a permanent virtual circuit (PVC) of the network; (b) obtaining past network traffic data for traffic over the PVC; (c) predicting future network traffic data for traffic over the PVC for a future time period based on the past network traffic data; and (d) based on the predicted future network traffic data, determining and specifying an optimum CIR for the PVC for the future time period that will result in a minimum predicted total network usage fee for the future time period.

The present invention also provides a computer program product, comprising a computer usable medium having a computer readable program code embodied therein, said computer readable program code comprising an algorithm adapted to implement a method for network usage optimization, said method comprising the steps of (a) obtaining past network traffic data for traffic over a PVC of a network; (b) predicting future network traffic data for traffic over the PVC for a future time period based on the past network traffic data; and (c) based on the predicted future network traffic data, determining and specifying an optimum CIR for the PVC for the future time period that will result in a minimum predicted total network usage fee for the future time period.

The present invention also provides a network provisioning method, comprising integrating computer-readable code into a computing system, wherein the code in combination with the computing system is capable of performing the steps of (a) obtaining past network traffic data for traffic over a PVC of a network; (b) predicting future network traffic data for traffic over the PVC for a future time period based on the past network traffic data; and (c) based on the predicted future network traffic data, determining and specifying an optimum CIR for the PVC for the future time period that will result in a minimum predicted total network usage fee for the future time period.

The present invention also provides a method for utilizing a network so as to save network usage fees for a store using the network.

DETAILED DESCRIPTION OF THE INVENTION

Figure 1:
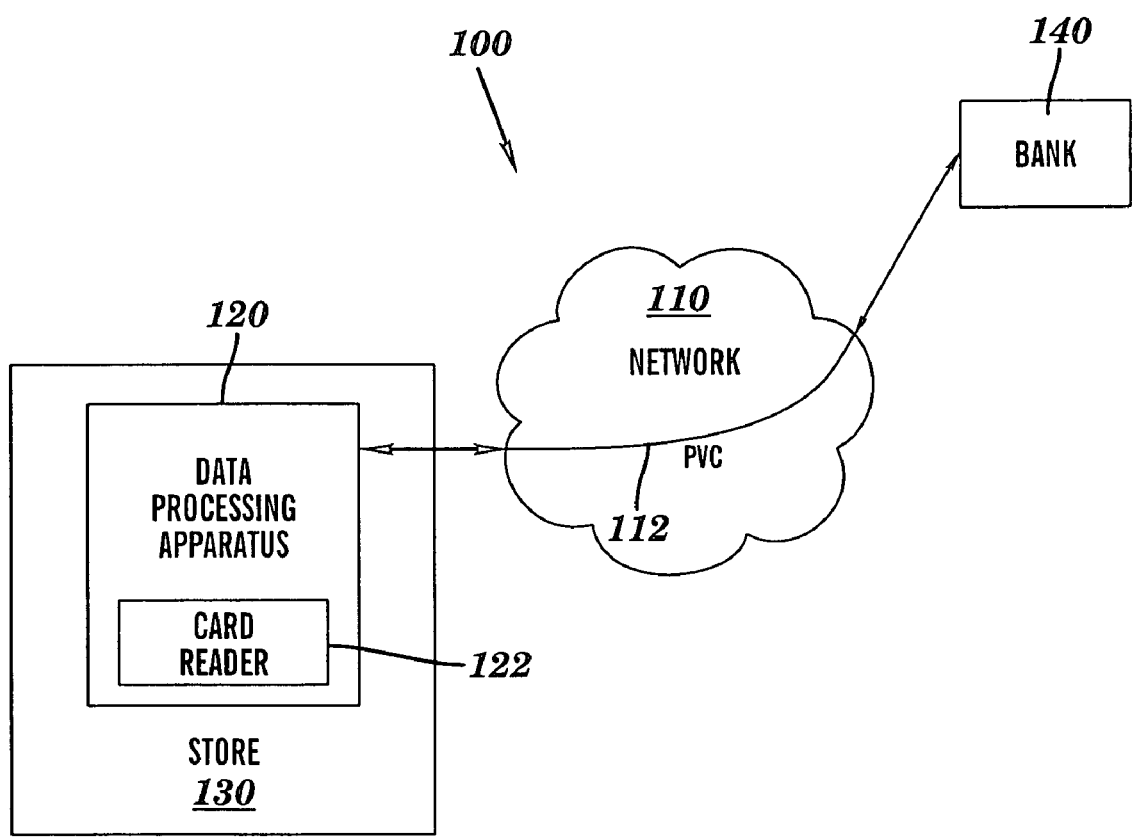
FIG. 1 illustrates a system including a network, in accordance with embodiments of the present invention.

FIG. 1 illustrates a system 100, in accordance with embodiments of the present invention. Illustratively, the system 100 can comprise a network 110, a data processing apparatus 120 (in a store 130) coupled to the network 110, and a bank 140 coupled to the network 110. The network 110 can be a frame-relay network in which data is transmitted in frames. The store 130 is used for illustration. In general, data processing apparatus 120 can reside at any point of sale where sale transaction traffic and/or management transaction traffic can be originated.

As an example of the operation of the system 100, assume that a customer presents a credit card for payment of a purchase at the store 130. The credit card can be swiped at a card reader 122 (a part of the data processing apparatus 120) at a check-out register (not shown) of the store 130. In response, a credit authorization request can be generated by the data processing apparatus 120 and sent from the store 130 to the bank 140 (assuming the bank 140 is the issuer of the credit card) via the network 110.

The store 130 has to pay network usage fees for using the network 110. The network usage fees can include PVC (permanent virtual circuits) fee, CIR (committed information rate) fee, and transmission overflow fee. The definitions of PVC and CIR and the discussions of the PVC fees, the CIR fees, and the transmission overflow fees are below.

A permanent virtual circuit (PVC) is a software-defined logical connection in a network such as a frame relay network. A network user (a company or a client of the network provider) can specify to the network provider a logical connection (i.e., a PVC) between two end points. The network user can also specify to the network provider a required bandwidth called a Committed Information Rate (CIR) for the specified PVC. Then, the network provider sets up the frame relay network such that frame relay technology will manage the physical network to achieve the specified PVC and CIR. The specified CIR may not exceed the possible physical bandwidth. The network user can specify multiple PVCs and also specify a CIR for each of those PVCs. Typically, multiple PVCs can share the same physical path at the same time.

In the system 100, the store 130 (or more accurately, the management of the store 130) can specify to the network provider of the network 110 one or multiple PVCs. For example, the store 130 can specify to the network provider of the network 110 two PVCs of which one PVC is for regular use, and the other PVC is for emergency backup. In other words, the store 130 leases the two PVCs from the network provider. If the store 130 leases more PVCs, then the store 130 has to pay a higher PVC fee. The store 130 can obtain from the network provider a PVC fee schedule which indicates how much money the network provider charges if the store 130 leases one, two, or more PVCs (e.g., $10/1 PVC/month, $18/2 PVCs/month, $24/3 PVCs/month, etc.)

For each of the leased PVCs, the store 130 can specify a CIR (e.g., 20 Kb/s). The network provider can charge a higher CIR fee for a higher specified CIR. At any point of time, if traffic rate over the PVC is less than the CIR of the PVC, the network provider guarantees that no data loss would occur.

But if traffic rate over the PVC exceeds the CIR of the PVC (i.e., a data transmission overflow), data loss may occur. For each data transmission overflow whose duration exceeds a predetermined duration (set by the network provider), the network provider can charge a transmission overflow fee proportional to the time in excess of the predetermined duration. For example, the network provider can set the predetermined duration at 2 minutes. As a result, for a transmission overflow that lasts for 10 minutes, the store 130 will be charged a transmission overflow fee proportional to the excess time of 8 minutes. The store 130 can obtain from the network provider a transmission overflow fee schedule which indicates how transmission overflow fees are charged.

FIG. 1 shows a PVC 112 (represented by a line 112) connecting the store 130 and the bank 140. To reduce data transmission overflow fees for the PVC 112, the store 130 can request the network provider to increase CIR for the PVC 112. However, by doing so, the store 130 has to pay a higher CIR fee for the higher CIR. The store 130 can obtain from the network provider a CIR fee schedule which indicates how much money the network provider charges for each CIR for a PVC (e.g., $10/month for CIR=20 Kb/s; $15/month for CIR=30 Kb/s; $20/month for CIR=40 Kb/s, etc.)

Figure 2:
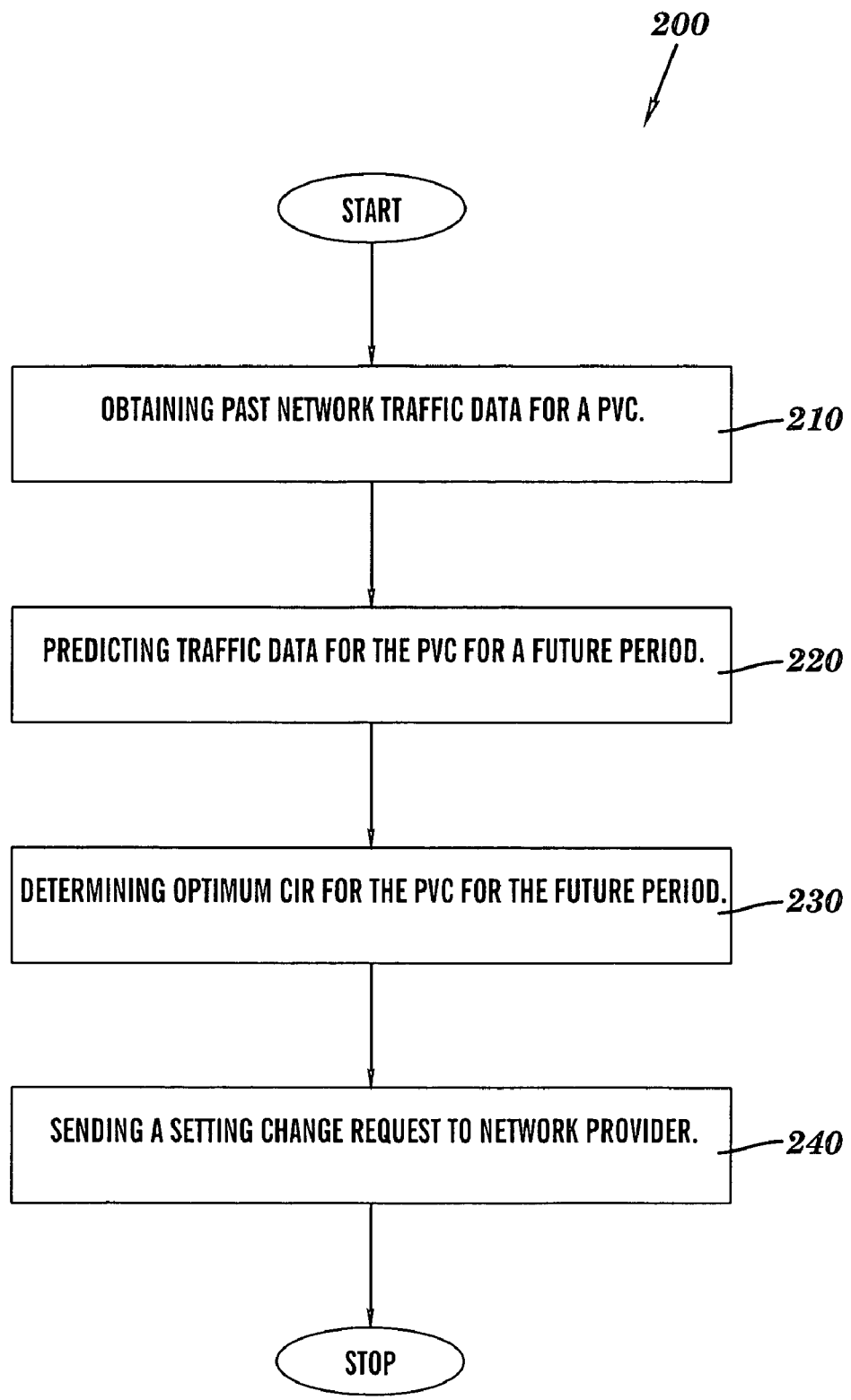
FIG. 2 illustrates a flow chart of a method for determining an optimum CIR for a PVC of the network of FIG. 1, in accordance with embodiments of the present invention.

FIG. 2 illustrates a flow chart of a method 200 for determining an optimum CIR for the PVC 112 in the network 110 of FIG. 1, in accordance with embodiments of the present invention. With reference to FIGS. 1 and 2, the method 200 can start with a step 210 in which the store 130 can obtain past network traffic data for traffic over the PVC 112.

The past network traffic data can include traffic rate (Kb/s) on the PVC at any time of a time period. The past network traffic data can be obtained from the network provider. Alternatively, the past network traffic data can be obtained by summing up all transactions originated from the store 130 that add to the traffic on the PVC 112 and then calculating the traffic rate on the PVC 112 at any time in a time period.

For example, assume that during a time period of 1 minute from 8:05 AM to 8:06 AM on a certain day in the past, there were 1,000 credit authorization requests (i.e., sale transaction traffic) and 500 payroll update transactions (i.e., management transaction traffic) sent from the store 130 over the PVC 112. Assume further that each credit authorization request is 400 bits (50 Bytes) long and each payroll update transaction is 600 bits (75 Bytes) long, then the traffic rate on the PVC 112 during the minute is 1,000 credit authorization requests×400 bits/request+500 payroll update transactions×600 bits/transaction=700,000 bits/minute or around 11.67 Kb/s. In a similar manner, a total traffic rate can be calculated for any minute during the day. As a result, in general, the traffic rate over the PVC 112 for any past time period can be plotted as a curve in an X-Y axis system with X-axis representing time and Y-axis representing traffic rate.

Next, in step 220, the past network traffic data obtained in step 210 can be used to predict traffic over the PVC 112 for a future time period. In one embodiment, traffic data from past time periods equivalent to the future time period can be used to predict the traffic over the PVC 112 in the future time period. "Equivalent" as used herein is defined as having the same characteristics that may affect the data traffic between over the PVC 112. For example, Saturdays are equivalent time periods. But a Saturday and a Wednesday are not because there are usually more shoppers visiting the store 130 on a Saturday than on a Wednesday. As a result, more data traffic would be transmitted over the PVC 112 on a Saturday than on a Wednesday. Therefore, traffic data from past Saturdays can be used to predict traffic over the PVC for a future Saturday.

In one embodiment, the average of the data traffic of the past Saturdays can be used to predict traffic over the PVC 112 for the future Saturday. For example, if during a time period of 1 minute from 8:05 AM to 8:06 AM, past Saturdays 1, 2 and 3 had traffic rates of 10 Kb/s, 12 Kb/s, and 14 Kb/s, then it can be predicted that the traffic over the PVC 112 during a time period of 1 minute from 8:05 AM to 8:06 AM on the future Saturday will be at (10+12+14)/3=12 Kb/s. In a similar manner, the traffic over the PVC 112 can be predicted for any time on the future Saturday.

In one embodiment, the traffic over the PVC for a past Saturday can be used to predict the traffic for the future Saturday if traffic pattern for the days before the past Saturday and traffic pattern for the days before the future Saturday are essentially the same. "Essentially the same" as used here can be numerically defined as less than 15% difference. For example, assume today is Friday, and the future Saturday is this weekend. Assume further that the average traffic rates for Monday, Tuesday, Wednesday, and Thursday right before the past Saturday are 20, 30, 40, and 50 Kb/s, respectively, and that the average traffic rates for Monday, Tuesday, Wednesday, and Thursday right before the future Saturday are 22, 32, 41, and 55 Kb/s, respectively. The traffic difference between the two Mondays is (22−20)/20=10%<15%. Similarly, the traffic difference between the two Tuesdays, two Wednesdays, and two Thursdays are all less than 15%. As a result, the traffic pattern preceding the future Saturday is essentially the same as the traffic pattern preceding the past Saturday. Moreover, the two Saturdays are equivalent. Therefore, the traffic data of the past Saturday (which is available) can be used to predict the traffic over the PVC 112 for the future Saturday.

Here, Saturdays are used for illustration only. In general, the present invention can apply to any time periods (e.g., any hour of a day, any day of a week, any week of a month, etc.) "Essentially the same" is defined above as less than 15% difference. In general, any percentage number can be used.

Next, in step 230, the predicted traffic data for the future period can be used to determine an optimum CIR for the PVC 112 for the future period. More specifically, in the example above, the predicted traffic data of the future Saturday can be used in combination with data from a transmission overflow fee schedule and a CIR fee schedule obtained from the network provider to predict the total network usage fees corresponding to all possible CIRs in the CIR fee schedule.

For example, assume that the CIR fee schedule indicates the network provider offers only three CIRs for a PVC: $10/month for CIR=20 Kb/s; $15/month for CIR=30 Kb/s; and $20/month for CIR=40 Kb/s. For CIR=20 Kb/s, the predicted traffic data of the future Saturday can be used to determine the corresponding predicted transmission overflow fee. Assume that the first transmission overflow fee is $50. As a result, the total network usage fee if CIR=20 Kb/s is selected is: CIR fee+transmission overflow fee=$10+$50=$60. In a similar manner, two other total network usage fees can be determined for the CIRs of 30 Kb/s and 40 Kb/s (say, $55 and $65, respectively). As a result, CIR=30 Kb/s can be selected as the optimum CIR for the PVC 112 for the future Saturday because it will result in a minimum predicted total network usage fee of $55 (compared with $60 and $65 for the CIRs of 20 Kb/s and 40 Kb/s, respectively).

Next, in step 240, in one embodiment, the store 130 can send a setting change request from the data processing apparatus 120 to the network provider via the network 110. The setting change request can specify the optimum CIR (determined in step 230) for the PVC 112 and for the future time period (i.e., the future Saturday in the example above). In one embodiment, the past network traffic data obtained in step 210 can be stored for future use.

In summary, the past network traffic data for the PVC 112 can be obtained and used to predict traffic over the PVC 112 for a future period. Then, based on the CIR and transmission overflow fee schedules, an optimum CIR can be determined for the future period. Then, the optimum CIR can be specified to the network provider (by sending a setting change request) for the PVC 112 for the future period.

Figure 3:
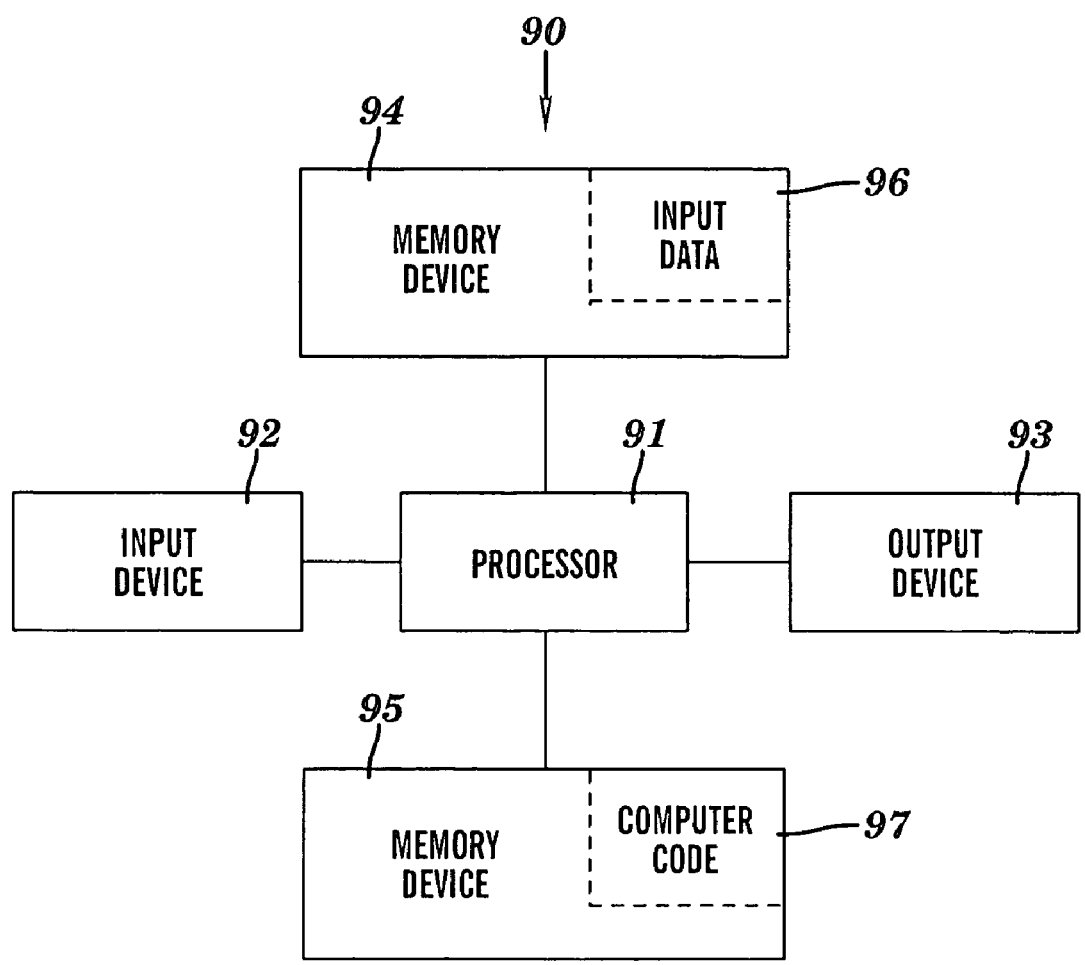
FIG. 3 illustrates a computer system for performing the method of FIG. 2, in accordance with embodiments of the present invention.

FIG. 3 illustrates a computer system 90 that can be used for performing the steps of the method 200 of FIG. 2, in accordance with embodiments of the present invention. In one embodiment, the computer system 90 can be a part of the data processing apparatus 120 of FIG. 1. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for performing the method 200 of FIG. 2. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying computing infrastructure, comprising integrating computer-readable code into the computer system 90, wherein the code in combination with the computer system 90 is capable of performing the method 200 of FIG. 2.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A network usage optimization method, comprising the steps of:
(a) providing a network and a data processing apparatus, wherein the data processing apparatus communicates via a permanent virtual circuit (PVC) of the network;
(b) obtaining past network traffic data for traffic over the PVC;
(c) predicting future network traffic data for traffic over the PVC for a future time period based on the past network traffic data; and
(d) based on the predicted future network traffic data, determining and specifying an optimum CIR for the PVC for the future time period that will result in a minimum predicted total network usage fee for the future time period, said determining the CIR for the PVC for the future time period being performed by a processor of a computer system,
wherein step (c) comprises:
specifying a percentage;
comparing traffic over the PVC between a first past time period and a second past time period;
comparing traffic over the PVC between a third past time period and a fourth past time period; and
in response to both a first traffic difference between the first and second past time periods and a second traffic difference between the third and fourth past time periods being less than the specified percentage, using traffic data of a fifth past time period as predicted traffic data over the PVC for a future time period.

2. The method of claim 1, wherein the step of determining the CIR for the PVC for the future time period is further based on a CIR fee schedule and a transmission overflow fee schedule.

3. The method of claim 1, wherein the step of determining the CIR for the PVC for the future time period comprises the steps:
(i) based on the predicted future network traffic data, determining a predicted total network usage fee for the future period for each of a plurality of CIRs; and
(ii) selecting as the optimum CIR the CIR of the plurality of CIRs that is associated with the minimum predicted total network usage fee of the predicted total network usage fees.

4. The method of claim 1, wherein the step of specifying the CIR for the PVC for the future time period comprises the step of sending a setting change request via the network.

5. The method of claim 1,
wherein the first and second past time periods are a same day of the week,
wherein the third and fourth past time periods are a same day of the week,
wherein the fifth past time period and the future time period are a same day of the week,
wherein the first, third, and fifth past time periods are in a same week, and
wherein the second and fourth past time periods and the future time period are in a same week.

6. A computer program product, comprising a computer usable medium having a computer readable program code embodied therein, said computer readable program code comprising an algorithm implementing a method for network usage optimization, said method comprising the steps of:
(a) obtaining past network traffic data for traffic over a PVC of a network;
(b) predicting future network traffic data for traffic over the PVC for a future time period based on the past network traffic data; and
(c) based on the predicted future network traffic data, determining and specifying an optimum CIR for the PVC for the future time period that will result in a minimum predicted total network usage fee for the future time period, wherein step (b) comprises:
specifying a percentage;
comparing traffic over the PVC between a first past time period and a second past time period;
comparing traffic over the PVC between a third past time period and a fourth past time period; and
in response to both a first traffic difference between the first and second past time periods and a second traffic difference between the third and fourth past time periods being less than the specified percentage, using traffic data of a fifth past time period as predicted traffic data over the PVC for a future time period.

7. The computer program product of claim 6,
wherein the first and second past time periods are a same day of the week,
wherein the third and fourth past time periods are a same day of the week,
wherein the fifth past time period and the future time period are a same day of the week,
wherein the first, third, and fifth past time periods are in a same week, and
wherein the second and fourth past time periods and the future time period are in a same week.

8. A network usage optimization method, comprising the steps of:
(a) providing a network and a data processing apparatus, wherein the data processing apparatus communicates via a permanent virtual circuit (PVC) of the network;
(b) obtaining past network traffic data for traffic over the PVC;
(c) predicting future network traffic data for traffic over the PVC for a future time period based on the past network traffic data; and
(d) based on the predicted future network traffic data, determining and specifying an optimum CIR for the PVC for the future time period that will result in a minimum predicted total network usage fee for the future time period, said determining the CIR for the PVC for the future time period being performed by a processor of a computer system, wherein the minimum predicted total network usage fee for the future time period is based on the total network usage fee consisting of a sum of a CIR fee and a transmission overflow fee, wherein the CIR fee is a function of the CIR such that said function of the CIR increases as the CIR increases, and wherein the transmission overflow fee is proportional to an excess time over which traffic over the PVC exceeds the CIR.

9. The method of claim 8, wherein step (c) comprises the step of predicting the future network traffic data for the future time period based on traffic data of a plurality of past time periods equivalent to the future time period.

10. The method of claim 9, wherein step (c) comprises the step of predicting the future network traffic data for the future time period to be an average traffic data of the plurality of past time periods.

11. The method of claim 9, wherein the future time period and the plurality of past time periods are all the same day of the week.

12. A computer program product, comprising a computer usable medium having a computer readable program code embodied therein, said computer readable program code comprising an algorithm implementing a method for network usage optimization, said method comprising the steps of:
(a) obtaining past network traffic data for traffic over a PVC of a network;
(b) predicting future network traffic data for traffic over the PVC for a future time period based on the past network traffic data; and
(c) based on the predicted future network traffic data, determining and specifying an optimum CIR for the PVC for the future time period that will result in a minimum predicted total network usage fee for the future time period, wherein the minimum predicted total network usage fee for the future time period is based on the total network usage fee consisting of a sum of a CIR fee and a transmission overflow fee, wherein the CIR fee is a function of the CIR such that said function of the CIR increases as the CIR increases, and wherein the transmission overflow fee is proportional to an excess time over which traffic over the PVC exceeds the CIR.

13. The computer program product of claim 12, wherein step (b) comprises the step of predicting the future network traffic data for the future time period based on traffic data of a plurality of past time periods equivalent to the future time period.

14. The computer program product of claim 13, wherein step (b) comprises the step of predicting the future network traffic data for the future time period to be an average traffic data of the plurality of past time periods.

15. The computer program product of claim 13, wherein the future time period and the plurality of past time periods are all the same day of the week.

16. A network provisioning method, comprising integrating computer-readable code into a computing system, wherein the code in combination with the computing system performs the steps of:
(a) obtaining past network traffic data for traffic over a PVC of a network;
(b) predicting future network traffic data for traffic over the PVC for a future time period based on the past network traffic data; and
(c) based on the predicted future network traffic data, determining and specifying an optimum CIR for the PVC for the future time period that will result in a minimum predicted total network usage fee for the future time period, said determining the CIR for the PVC for the future time period being performed by a processor of a computer system,
wherein step (b) comprises:
specifying a percentage;
comparing traffic over the PVC between a first past time period and a second past time period;
comparing traffic over the PVC between a third past time period and a fourth past time period; and
in response to both a first traffic difference between the first and second past time periods and a second traffic difference between the third and fourth past time periods being less than the specified percentage, using traffic data of a fifth past time period as predicted traffic data over the PVC for a future time period.

17. The method of claim 16,
wherein the first and second past time periods are a same day of the week,
wherein the third and fourth past time periods are a same day of the week,
wherein the fifth past time period and the future time period are a same day of the week,
wherein the first, third, and fifth past time periods are in a same week, and
wherein the second and fourth past time periods and the future time period are in a same week.

18. A network provisioning method, comprising integrating computer-readable code into a computing system, wherein the code in combination with the computing system performs the steps of:
- (a) obtaining past network traffic data for traffic over a PVC of a network;
- (b) predicting future network traffic data for traffic over the PVC for a future time period based on the past network traffic data; and
- (c) based on the predicted future network traffic data, determining and specifying an optimum CIR for the PVC for the future time period that will result in a minimum predicted total network usage fee for the future time period, said determining the CIR for the PVC for the future time period being performed by a processor of a computer system, wherein the minimum predicted total network usage fee for the future time period is based on the total network usage fee consisting of a sum of a CIR fee and a transmission overflow fee, wherein the CIR fee is a function of the CIR such that said function of the CIR increases as the CIR increases, and wherein the transmission overflow fee is proportional to an excess time over which traffic over the PVC exceeds the CIR.

19. The method of claim 18, wherein step (b) comprises the step of predicting the future network traffic data for the future time period based on traffic data of a plurality of past time periods equivalent to the future time period.

20. The method of claim 19, wherein step (b) comprises the step of predicting the future network traffic data for the future time period to be an average traffic data of the plurality of past time periods.

* * * * *